US010419482B2

United States Patent
Gao et al.

(10) Patent No.: US 10,419,482 B2
(45) Date of Patent: Sep. 17, 2019

(54) METHOD AND APPARATUS FOR ACQUIRING SIP SIGNALING DECRYPTION PARAMETERS

(71) Applicant: ZTE Corporation, Shenzhen, Guangdong (CN)

(72) Inventors: Zhisen Gao, Shenzhen (CN); Longyun Qi, Shenzhen (CN); Lei Chen, Shenzhen (CN)

(73) Assignee: ZTE CORPORATION (CN)

( * ) Notice: Subject to any disclaimer, the term of this patent is extended or adjusted under 35 U.S.C. 154(b) by 147 days.

(21) Appl. No.: 15/511,387

(22) PCT Filed: May 25, 2015

(86) PCT No.: PCT/CN2015/079709
§ 371 (c)(1),
(2) Date: Mar. 15, 2017

(87) PCT Pub. No.: WO2016/041374
PCT Pub. Date: Mar. 24, 2016

(65) Prior Publication Data
US 2017/0295204 A1   Oct. 12, 2017

(30) Foreign Application Priority Data
Sep. 18, 2014   (CN) .......................... 2014 1 0476841

(51) Int. Cl.
*H04L 29/06*       (2006.01)
*H04W 80/10*      (2009.01)
(Continued)

(52) U.S. Cl.
CPC ............ *H04L 63/168* (2013.01); *H04L 43/00* (2013.01); *H04L 63/0281* (2013.01);
(Continued)

(58) Field of Classification Search
CPC combination set(s) only.
See application file for complete search history.

(56) References Cited

U.S. PATENT DOCUMENTS

2003/0204608 A1   10/2003   Isomaki
2006/0018291 A1*   1/2006   Patel .................. H04L 63/0407
                                                       370/335
(Continued)

FOREIGN PATENT DOCUMENTS

| CN | 1722689 A | 1/2006 |
| CN | 1801698 A | 7/2006 |

(Continued)

OTHER PUBLICATIONS

International Search Report in international application No. PCT/CN2015/079709, dated Aug. 28, 2015, 2 pgs.
(Continued)

*Primary Examiner* — Khoi V Le
(74) *Attorney, Agent, or Firm* — McDonald Hopkins LLC

(57) ABSTRACT

Disclosed in the embodiment of the present invention is a method for acquiring session initiation protocol (SIP) signaling decryption parameters and the method comprises the following steps: the authentication information of the Gm interface and the authentication information of the Cx interface are acquired; a security association (SA) decryption table is created according to the acquired authentication information of the Cx interface and authentication information of the Gm interface, wherein the SA decryption table comprises SIP signaling decryption parameters. A device for acquiring SIP signaling decryption parameters is also disclosed in the embodiments of the present invention.

8 Claims, 4 Drawing Sheets

(51) Int. Cl.
  *H04L 12/26* (2006.01)
  *H04W 24/08* (2009.01)
(52) U.S. Cl.
  CPC ........ *H04L 63/0435* (2013.01); *H04L 63/061* (2013.01); *H04L 63/306* (2013.01); *H04L 65/1006* (2013.01); *H04W 24/08* (2013.01); *H04W 80/10* (2013.01)

(56) References Cited

U.S. PATENT DOCUMENTS

| | | | |
|---|---|---|---|
| 2007/0294186 A1* | 12/2007 | Yan .................... | G06Q 20/3829 705/71 |
| 2012/0159151 A1 | 6/2012 | Janakiraman | |
| 2013/0269001 A1 | 10/2013 | Janakiraman et al. | |
| 2014/0007211 A1* | 1/2014 | Yang ........................ | H04L 63/08 726/7 |
| 2014/0099888 A1* | 4/2014 | Flanagan .............. | H04W 4/023 455/41.1 |
| 2014/0122874 A1 | 5/2014 | Janakiraman et al. | |
| 2014/0128031 A1* | 5/2014 | Park ........................ | H04L 63/18 455/411 |
| 2014/0169563 A1 | 6/2014 | Yan | |
| 2015/0312300 A1* | 10/2015 | Mosko .................. | H04L 63/164 713/171 |

FOREIGN PATENT DOCUMENTS

| | | |
|---|---|---|
| CN | 1878169 A | 12/2006 |
| CN | 101043744 A | 9/2007 |
| CN | 101330504 A | 12/2008 |
| CN | 101729854 A | 6/2010 |
| EP | 2469752 A1 | 6/2012 |
| EP | 2725762 A1 | 4/2014 |
| WO | 2010091563 A1 | 8/2010 |

OTHER PUBLICATIONS

English Translation of the Written Opinion of the International Search Authority in international application No. PCT/CN2015/079709, dated Aug. 28, 2015 4 pgs.

"The Signaling Monitoring Scheme of LTE System", 2013, Wu Cuixian, Wang Shengnan and Liu Zhiguang, IEEE Third International Conference on Instrumentation, Measurement, Computer, Communication and Control pp. 403-406.

Supplementary European Search Report in European application No. 15842301.2, dated Jul. 24, 2017, 7 pgs.

* cited by examiner

METHOD AND APPARATUS FOR ACQUIRING SIP SIGNALING DECRYPTION PARAMETERS

TECHNICAL FIELD

The disclosure relates to the field of communications, and in particular to a method and apparatus for acquiring a Session Initiation Protocol (SIP) signaling decryption parameter.

BACKGROUND

As mobile communication technologies develop continuously, operators around the world already have deployed and tested Long Term Evolution (LTE) networks/4G networks, and 4G networks have gradually entered our daily life. The multimedia service of LTE network evolution is realized by creating an IP Multimedia Subsystem (IMS), that is, a 4G user equipment (UE) accesses the IMS through an Evolved Packet System (EPS) to realize media services such as a voice service and a short message service and the like. To guarantee the security of an access, the IMS can selectively encrypt an SIP signaling at a Gm interface between a UE and a Proxy Call Session Control Function (P-CSCF), and the authorization of the IMS is authenticated by the ESP mechanism providing Internet Protocol Security (IPsec), thereby realizing a secure access to the IMS system.

According to the Authentication and Key Agreement (AKA) mechanism of an IMS for authorization and authentication, a security mechanism is negotiated, IPSec ESP-related parameters are exchanged, and a Security Association (SA) is established between a UE and a P-CSCF during the registration process of the UE, so that each SIP signaling subsequently passing the SA is encrypted. That is, an SIP signaling is transmitted between the UE and the P-CSCF through an SA tunnel (IPSec encryption tunnel), and the Session Initiation Protocol (SIP) signaling is an encrypted SIP signaling.

The encryption for an SIP signaling guarantees the security of an access to an IMS but makes the signaling monitoring system of an LTE network incapable of decrypting the SIP signaling, resulting in that an SIP-based voice over Internet Protocol (SIP-VOIP) service cannot be monitored.

The problem that the signaling monitoring system of the ESP system cannot monitor an encrypted SIP-VOIP service is currently solved by directly deploying a signaling collection system in an IMS system in which an SIP signaling is unencrypted. However, the IMS system is typically an independent system which is independent from an EPS system and which is generally not opened by a network operator. The deployment of a signaling collection system in an IMS system is equivalent to additional setting a monitoring system. Thus, the operating cost of the operator is increased. Moreover, because the additionally set monitoring system does not belong to the signaling monitoring system of the EPS system, it cannot be associated with the other signaling such as the wireless network or the core network of the EPS system or acquire an overall index. Thus, an SIP-VOIP session service cannot be monitored by the signaling monitoring system of the EPS, as a result, operational requirements of the operator cannot be met.

Therefore, the SIP signaling decryption method used in the conventional art increases the operating cost of the operator but still fails to meet operational requirements of the operator and lowers the operational result of a network provided by the operator.

SUMMARY

A method and apparatus for acquiring an SIP signaling decryption parameter are provided in the disclosure to address the problem that the SIP signaling decryption method used in the conventional art increases the operating cost of the operator but still fails to meet operational requirements of the operator and reduce the operational result of a network provided by the operator.

A method for acquiring an SIP signaling decryption parameter is provided including the following steps of acquiring authentication information of a Gm interface and authentication information of a Cx interface; and generating an SA decryption table including SIP signaling decryption parameters according to the acquired authentication information of the Gm interface and authentication information of the Cx interface.

In an exemplary embodiment, the step of acquiring the authentication information of the Gm interface may include: acquiring an SIP registration request sent from a client and a response signaling based on the registration request, wherein the registration request and the response signaling for the registration request are clear-text SIP signaling, and access SIP encryption parameters are carried in the registration request; and performing SIP decoding according to the registration request and the response signaling based on the registration request to obtain the authentication information of the Gm interface in a registration flow.

In an exemplary embodiment, the step of acquiring the authentication information of the Cx interface may include: acquiring an authentication request of the Cx interface sent from a network element and a response signaling based on the authentication request; and performing protocol decoding according to the authentication request and the response signaling based on the authentication request to obtain the authentication information of the Cx interface.

In an exemplary embodiment, after the step of generating the SA decryption table according to the acquired authentication information of the Cx interface and authentication information of the Gm interface, the method may further include: determining IP information and port information of an SIP signaling of an SA encryption tunnel when the SIP signaling is acquired; searching, according to the acquired IP information and port information, the SA decryption table to obtain a decryption algorithm and key of an SA; decrypting the SIP signaling with the obtained decryption algorithm and key to obtain a clear-text SIP signaling corresponding to the encrypted SIP signaling; and decoding the decrypted clear-text SIP signaling to obtain session data corresponding to the SIP signaling.

In an exemplary embodiment, after generating the SA decryption table according to the acquired authentication information of the Cx interface and authentication information of the Gm interface, the method may further include: acquiring an SIP registration information update request sent from a client through the SA encryption tunnel and a response signaling based on the update request, wherein the update request and the response signaling for the update request indicate an update of the access SIP encryption parameters; decrypting the update request and the response signaling for the update request according to the SA decryption table to obtain a decrypted update request and a decrypted response signaling for the update request; and acquiring the authentication information of the Gm interface and the authentication information of the Cx interface in an update registration flow according to the decrypted update request and the decrypted response signaling for the update request so as to generate an updated SA decryption table.

An apparatus for acquiring an SIP signaling decryption parameter is also provided which includes: an acquisition module arranged to acquire authentication information of a Gm interface and authentication information of a Cx interface; and a generation module arranged to generate an SA decryption table according to the acquired authentication information of the Gm interface and authentication information of the Cx interface, wherein the SA decryption table includes SIP signaling decryption parameters.

In an exemplary embodiment, the acquisition module includes an acquisition unit and a decoding unit. The acquisition unit is arranged to acquire an SIP registration request sent from a client and a response signaling based on the registration request. The registration request and the response signaling for the registration request are clear-text SIP signaling, and access SIP encryption parameters are carried in the registration request. The decoding unit is arranged to perform SIP decoding according to the registration request and the response signaling based on the registration request to obtain the authentication information of the Gm interface in a registration flow.

In an exemplary embodiment, the acquisition unit is further arranged to acquire an authentication request of the Cx interface sent from a network element and a response signaling based on the authentication request. The decoding unit is further arranged to perform protocol decoding according to the authentication request and the response signaling based on the authentication request to obtain the authentication information of the Cx interface.

In an exemplary embodiment, the apparatus for acquiring the SIP signaling decryption parameter acquisition parameter may further include a decryption module. The acquisition unit is further arranged to determine IP information and port information of an SIP signaling of an encryption tunnel when the SIP signaling is acquired. The decryption module is arranged to search, according to the acquired IP information and port information, the SA decryption table to obtain a decryption algorithm and key of an SA and decrypt the SIP signaling with the obtained decryption algorithm and key to obtain a clear-text SIP signaling corresponding to the encrypted SIP signaling. The decoding unit is further arranged to decode the decrypted clear-text SIP signaling to obtain session data corresponding to the SIP signaling.

In an exemplary embodiment, the acquisition unit is further arranged to acquire an SIP registration information update request sent from a client through an SA encryption tunnel and a response signaling based on the update request. The update request and the response signaling for the update request indicate an update of the access SIP encryption parameters. The decryption module is further arranged to decrypt the update request and the response signaling for the update request according to the SA decryption table to obtain a decrypted update request and a decrypted response signaling for the update request. The generation module is further arranged to acquire the authentication information of the Gm interface and the authentication information of the Cx interface in a update registration flow according to the decrypted update request and the decrypted response signaling for the update request so as to generate an updated SA decryption table.

According to the embodiments of the disclosure, authentication information of a Cx interface and authentication information of a Gm interface is acquired and an SA decryption table in which SIP signaling decryption parameters are included is generated according to the acquired authentication information of the Cx interface and the Gm interface. An SIP signaling is decrypted with the SA decryption table. The SIP-VOIP session service can be monitored without additionally deploying a separate signaling monitoring system, while reducing the operating cost of the operator, meeting operational requirements of the operator and improving the operational result of a network provided by the operator.

DETAILED DESCRIPTION

Figure 1:
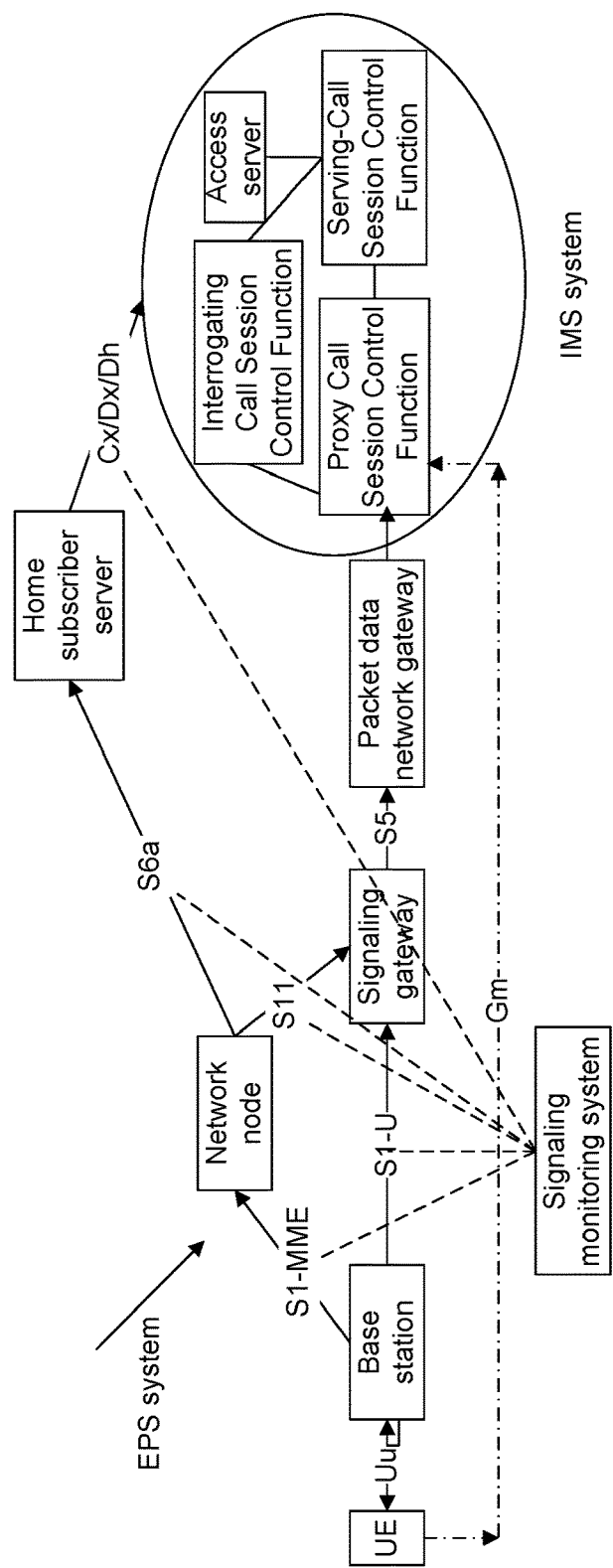
FIG. 1 is a framework in which SIP-VOIP service is monitored and analyzed by a signaling monitoring system of an LTE core network.

The UE attachment and the initiation of an SIP-VOIP session service by a UE in an LTE network are introduced first in embodiments of the disclosure. Refer to FIG. 1, which is a framework in which the SIP-VOIP service is monitored and analyzed by a signaling monitoring system of an LTE core network. A UE is attached to the EPS system of the LTE network. The attachment signaling of the UE may be collected at interfaces such as S1-MME, S11, S6a and S5 and the user information of a UE including an International Mobile Subscriber Identity (IMSI), a user number (MSISDN), an IP address of the user (UERIP) and an Access Point Name (APN) may be acquired. The UE may initiate, after being attached to the EPS system, a data service, an SIP-VOIP session service or the like. The signaling of such a service may be collected at interfaces S1-U and S5. When the UE initiates an SIP-VOIP session service, an SIP signaling is transmitted to an IMS system through interfaces S1-U and S5 of the EPS system, and the Gm interface signaling of the UE with a P-CSCF in the IMS system are transferred in the interface S1-U. The signaling monitoring system of the LTE can collect an SIP-VOIP signaling at the S1-U interface and associate it with user information and other interface information to form complete user signaling index data. To conduct an SIP-VOIP session service, the UE first performs an SIP registration with the IMS system. In the registration flow, an AKA authorization and authentication is implemented between the UE and the IMS to select whether or not to encrypt an access SIP signaling. When it is selected to encrypt an access SIP signaling, a registration initiation request and a response for the registration initiation request are unencrypted clear texts. The UE may negotiate with P-CSCF to establish a Security Association SA (that is, a secure IP tunnel) which includes an SA-IN for the UE to send a signaling to the P-CSCF and an SA-OUT for the P-CSCF to send a signaling to the UE. After the SA is established through the negotiation, the subsequent SIP signaling of the UE and the P-CSC may be transferred in a form of encryption through the encryption tunnels SA-IN and SA-OUT. An encrypted SIP signaling is collected by the signaling monitoring system at the interface S1-U. Encryption parameters of the SA-IN and the SA-OUT are carried in the unencrypted clear-text registration initiation request and response message. The cipher key is only transferred among the P-CSCF, an Interrogating Call Session Control Function (I-CSCF) and a Serving-Call Session Control Function (S-CSCF) in the IMS system. An authentication vector in which the cipher key is also included is transferred between the S-CSCF and the Cx interface of a Home Subscriber Server (HSS). A network element HSS is also included in the EPS system so that the interface signaling of the network element HSS may also be collected.

Based on the foregoing LTE network architecture, a method for acquiring an SIP signaling decryption parameter is provided in an embodiment of the disclosure.

Figure 2:
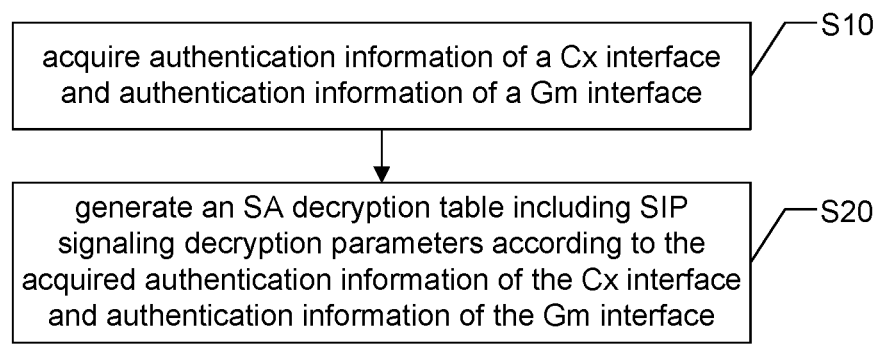
FIG. 2 is a flowchart of a method for acquiring an SIP signaling decryption parameter according to a first embodiment of the disclosure.

Refer to FIG. 2 which is a flowchart of a method for acquiring an SIP signaling decryption parameter according to a first embodiment of the disclosure.

In the embodiment, the method for acquiring an SIP signaling decryption parameter includes the following steps.

At step S10, authentication information of a Cx interface and authentication information of a Gm interface is acquired.

The method for acquiring an SIP signaling decryption parameter according to the embodiment of the disclosure may be performed by a signaling monitoring system or a signaling control device. In the present embodiment, the method is performed by a signaling monitoring system. Optionally, the embodiment of the disclosure is applicable to acquiring decryption parameters of an SIP signaling in a network session and decrypting the SIP signaling in the network session with the acquired decryption parameters.

In the embodiment, when a user of the UE desires to make an SIP-VOIP session service with the UE, he needs to register the SIP-VOIP session service. When the user hopes to encrypt a session process, he needs to indicate a requirement for an encrypted access during the registration process. The process of acquiring the authentication information of a Gm interface includes: acquiring an SIP registration request sent from a client and a response signaling based on the registration request, wherein the registration request and the response signaling for the registration request are clear-text SIP signaling, and SIP encryption parameters are carried in the registration request; and performing SIP decoding according to the registration request and the response signaling for the registration request to obtain the information of the client and the authentication information of the Gm interface in the registration flow.

The initial clear-text registration request message initiated by the UE to the P-CSCF carries a Security-Client field in which parameters of an SA are carried including parameters of the SA-IN and the SA-OUT at the UE side. the monitoring system collects registration message parameters of the Gm interface which include an IMPU, an IMPI, an SA-IN and an SA-OUT. The P-CSCF, the I-CSCF and the S-CSCF in the IMS system perform exchange information with each other. The registration message is transferred to the S-CSCF and the S-CSCF applies for an authentication vector quintuplet <RAND, AUTN, XRES, CK, IK> from the HSS through the Cx interface and an MAR message and an MAA message, in which CK is an cipher key, RAND is an authentication challenge for authenticating a user, XRES is a response expected to be returned from the user as the result of the authentication of the RAND, AUTN is an authentication token for a UE to authenticate a core network, and IK is an integral key. The process of acquiring the authentication information of the Cx interface includes: acquiring an authentication request of the Cx interface sent from a network element and a response signaling based on the authentication request; and decoding a DIAMETER protocol according to the authentication request and the response signaling based on the authentication request to obtain the authentication information of the Cx interface. The monitoring system acquires the MAR message and the MAA message of the Cx interface and an authentication quintuplet pair {IMPU, IMP, authentication quintuplet<RAND, AUTN, XRES, CK, IK>} of the Cx interface, as shown in table 3.

The S-CSCF sends a clear-text registration response 401 message in which authentication challenge information and an RAND, an AUTN, a CK and an IK are carried to the P-CSCF. The P-CSCF stores the CK and the IK, then deletes the CK and the IK, inserts the Security-Server field in which SA parameters including the parameters of the SA-IN and the SA-OUT at the P-CSCF side are carried, and sends the clear-text registration response 401 message to the UE. At this time, the parameters related to two unidirectional SAs at the side of the P-CSCF are provided.

TABLE 1

| SA-IN | SA-OUT | Description of fields |
|---|---|---|
| IMPU | IMPU | Public identify |
| IMPV | IMPV | Private identify |
| UE-SPI-C | UE-SPI-S | Indexes of security parameters at two sides of UE (client side and server side) |
| UE-IP | UE-IP | IP address of UE side |
| UE-PORT-C | UE-PORT-S | Ports of two sides of UE |
| P-CSCF-SPI-S | P-CSCF-SPI-C | Indexes of security parameters of two sides of P-CSCF |
| P-CSCF-IP | P-CSCF-IP | IP of P-CSCF |
| P-CSCF-PORT-S | P-CSCF-PORT-C | Ports of two sides of P-CSCF |
| TCP/UDP | TCP/UDP | Transport layer protocol |
| Encryption algorithm | Encryption algorithm | Encryption algorithm |
| CK | CK | Cipher key |
| Integrity algorithm | Integrity algorithm | Integrity algorithm |
| IK | IK | Integrity key |

TABLE 2

| IMPU | IMPI | Authentication parameter | SA-IN | SA-OUT |
|---|---|---|---|---|
| SIP:123@zte.com.cn | 123@zte.com.cn | <RAND, AUTN> | SA-IN | SA-OUT |

TABLE 3

| IMPU | IMPI | Authentication vector |
|---|---|---|
| SIP:123@zte.com.cn | 123@zte.com.cn | <RAND, AUTN, XRES, CK, IK> |

At step S20, an SA decryption table including SIP signaling decryption parameters is generated according to the acquired authentication information of the Gm interface and authentication information of the Cx interface.

After the authentication information of the Cx interface and the authentication information of the Gm interface are acquired, the SA decryption table including SIP signaling decryption parameters is generated according to the acquired authentication information of the Gm interface and authentication information of the Cx interface. The SA decryption table includes an IPMU, an IMPI, the SA-IN and the SA-OUT of an SA, a CK and an IK. After the SA decryption table is generated, each SIP encrypted signaling sent from the UE can be decrypted through the SA decryption table, thereby realizing an SIP signaling analysis. In the embodiments of the disclosure, an SIP signaling can be decrypted by merely collecting the authentication information of the Cx interface of an HSS, without deployment of another separate signaling monitoring system in the IMS system, thus, an SIP-VOIP session service is monitored while the operating cost of the operator is reduced.

The signaling monitoring system collects the parameters included in a registration response of the Gm interface to acquire parameter pairs {IMPU, IMPI, authentication parameters <RAND, AUTN>, SA parameters SA-IN and SA-OUT} used in the authentication of the Gm interface, as shown in table 2. The monitoring system acquires the SA decryption table {IMPU, IMPI, SA-IN, SA-OUT, CK, IK} for the user by using the IMPU, the IMPI, the authentication parameters <RAND, AUTN> together with the authentication quintuplet pair and the parameter pairs for authentication, as shown in table 1.

When the UE receives the registration response 401 message, it may extract the RAND and the AUTN, calculate an MAC and an SQN according to the AUTN and calculate an XMAC, an RES, an IK and a CK according to the RAND and a long-term key stored in an ISIM card. Like the MAC, the XMAC is used to certify the pass of a core network through an authentication. The RES will be returned to the IMS network in the next registration request. The IK and the CK will be used for SIP encryption and integrity protection. At this time, the parameters related to two unidirectional SAs at the UE side are provided. Two unidirectional SAs (SA-IN, SA-OUT) are established between the UE and the P-CSCF. Then all of the subsequent SIP signaling between the UE and the P-CSCF will be transmitted through the IP and the PORT of the SA (SA-IN, SA-OUT) and encrypted with the encryption algorithm and the cipher key (CK) in the SA. The current registration of the UE is completed.

The UE sends an encrypted registration request (with a challenge response, an RES value and so on) to the P-CSCF through an SA-IN encryption tunnel. The P-CSCF decrypts an IPsec encrypted packet which is received through the IP and port of the SA-IN tunnel with the encryption algorithm and the key CK to restore the IPsec encrypted packet to a clear-text registration request (with a challenge response) and sends the clear-text registration request to the S-CSCF. The S-CSCF compares the challenge response RES in the registration request with the XRES in the authentication vector. The UE will pass the authentication if the RES is the same as the XRES. The S-CSCF sends a registration success response 2000K to the P-CSCF. The P-CSCF sends an encrypted registration success response 2000K to the UE through the SA-OUT encryption tunnel. The UE decrypts an IPsec packet received through the IP and port of the SA-OUT tunnel with the encryption algorithm and the key CK to restore the IPsec packet to a clear-text registration success response 2000K. The registration of the UE is completed.

Generating an SA decryption table during a registration process includes: receiving an SIP registration request sent by a client and a corresponding registration response signaling, acquiring client information corresponding to the request and acquiring a Gm interface signaling and a Cx interface signaling; generating SA encryption parameters according to the acquired Gm interface signaling and Cx interface signaling; creating an SA decryption table corresponding to the encryption communication channel of the client according to the generated SA encryption parameters and the acquired client information, as shown in FIG. 1. An SIP encrypted signaling passing through the encryption communication channel can be decrypted into a clear-text SIP signaling with the SA decryption table.

After the registration is completed, the SA decryption table for SIP signaling of an SIP-VOIP session service is obtained, which is SA-IN parameters and SA-OU parameters in table 1. Refer to Table 2, the authentication information of the Gm interface includes an IMPU, an IPMI, authentication parameters RAND and AUTN and SA parameters SA-IN and SA-OUT. Refer to Table 3, the authentication information of the Cx interface includes an IMPU, an IMPI and an authentication vector (RAND, AUTN, XRES, CK and IK).

Subsequently, when the SA decryption table needs to be updated, an SIP registration information update request sent from a client through the SA encryption tunnel and a response signaling based on the update request are acquired. The update request and the response signaling for the update request indicate an update of the access SIP encryption parameters. The update request and the response signaling for the update request are decrypted according to the SA decryption table to obtain a decrypted update request and a decrypted response signaling for the update request. The authentication information of the Gm interface and the Cx interface in an update registration flow are acquired according to the decrypted update request and the decrypted response signaling for the update request to generate an updated SA decryption table.

The UE sends an encrypted registration request (with access SIP encryption parameters requesting an update) to the P-CSCF through the SA-IN encryption tunnel. The P-CSCF decrypts the IPsec packet received in the SA-IN tunnel with the encryption algorithm and the key CK to restore the IPsec packet to a clear-text registration request (with a challenge response) and sends the clear-text registration request to the S-CSCF. The S-CSCF sends a registration success response 2000K to the P-CSCF after it completes the interaction operations related to the authentication request and response of the Cx interface. The P-CSCF sends an encrypted registration success response 2000K with updated access SIP encryption parameters to the UE through the SA-OUT encryption tunnel.

An encrypted update registration request and an encrypted update registration response are collected. For the encrypted update registration request, SA-IN records of the SA decryption table are searched with the destination IP and port of the request for a decryption algorithm and a cipher key to decrypt the update registration request and the update registration response, so as to acquire a clear-text update registration request. For the encrypted update registration response, SA-OUT records of the SA decryption table are searched with the destination IP and port of the response for a decryption algorithm and a cipher key for decryption so as to acquire a clear-text update registration response. The decrypted update registration request and the decrypted update registration response are decoded to acquire the authentication information of the Gm interface. The authentication request and the authentication response are decoded to acquire the authentication information of the Cx interface. The authentication information of the Gm interface and the Cx interface in a registration update flow are acquired according to the decoded update request and the decoded response signaling for the update request so as to generate an updated SA decryption table.

According to the embodiment, authentication information of a Cx interface and authentication information of a Gm interface is acquired, and an SA decryption table including SIP signaling decryption parameters is generated according to the acquired authentication information of the Cx interface and the Gm interface, which will be used to decrypt an SIP signaling. An SIP-VOIP session service can be monitored without additionally deploying a separate signaling monitoring system, thus reducing the operating cost of the operator while meeting operational requirements of the operator and improving the operational result of a network provided by the operator.

Figure 3:
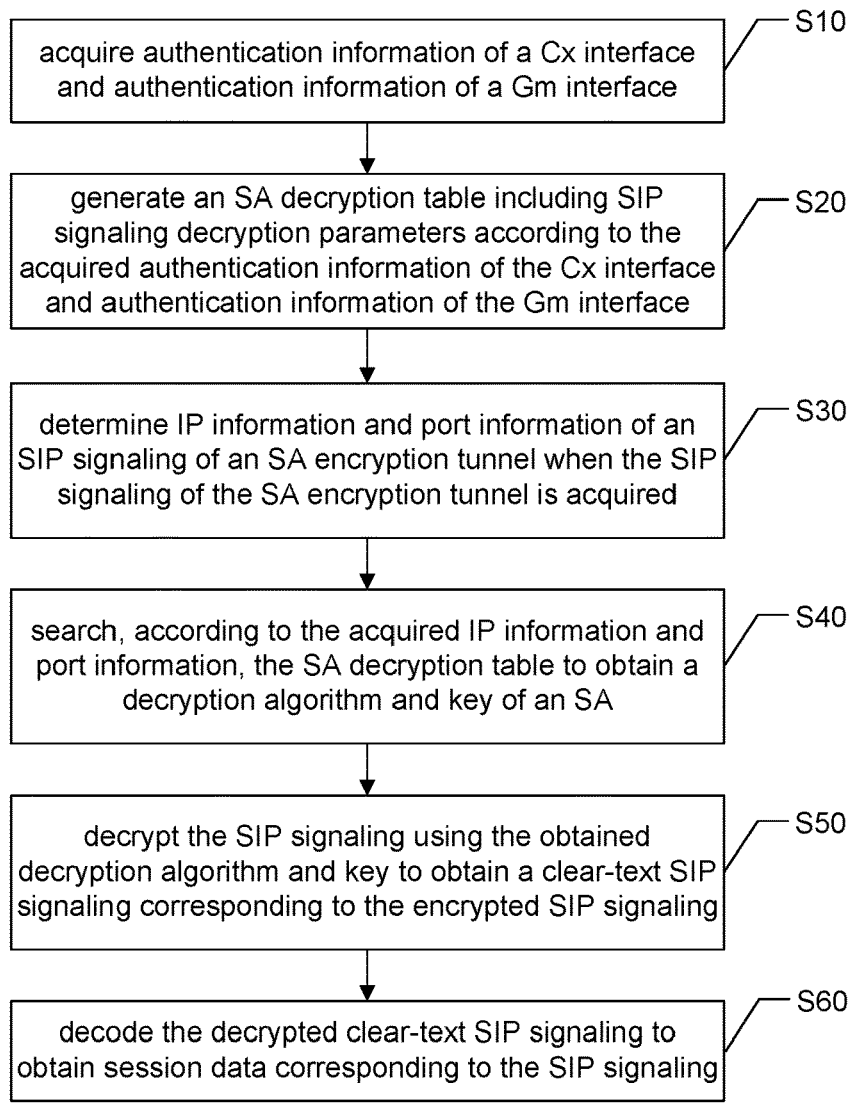
FIG. 3 is a flowchart of a method for acquiring an SIP signaling decryption parameter according to a second embodiment of the disclosure.

Refer to FIG. 3 which is a flowchart of a method for acquiring an SIP signaling decryption parameter according to a second embodiment of the disclosure. Based on the first embodiment of the method for acquiring an SIP signaling decryption parameter described above, after step S20, the method further includes the following steps.

At step S30, IP information and port information of the SIP signaling of an SA encryption tunnel is determined when the SIP signaling of the SA encryption tunnel is acquired.

At step S40, the SA decryption table is searched according to the acquired IP information and port information to obtain a decryption algorithm and key of an SA.

At step S50, the SIP signaling is decrypted with the obtained decryption algorithm and key to obtain a clear-text SIP signaling corresponding to the encrypted SIP signaling.

At step S60, the decrypted clear-text SIP signaling is decoded to obtain session data corresponding to the SIP signaling.

The SIP signaling may be an SIP signaling sent from the UE to a core network or an SIP signaling sent from the core network to the UE. For the encrypted SIP signaling sent from the UE to the core network, SA-IN records in the SA decryption table are searched with a destination address and port. For the encrypted SIP signaling sent from the core network to the UE, SA-OUT records in the SA decryption table are searched with a destination address and port. The IP information and the port information of an SIP signaling of the SA encryption tunnel are acquired when the SIP signaling of the SA encryption tunnel is acquired. The SA decryption table is searched according to the acquired IP information and port information for the decryption algorithm and the key of the SA, and the SIP signaling is decrypted using the obtained decryption algorithm and key to obtain a clear-text SIP signaling corresponding to the encrypted SIP signaling.

The decrypted clear-text SIP signaling is decoded to obtain session data corresponding to the SIP signaling. The decrypted clear-text SIP signaling can be transferred to a signaling analysis system, for example, a 4G network signaling monitoring system, which needs the decrypted clear-text SIP signaling. According to the embodiment, an encrypted SIP signaling is decrypted according to a generated SA decryption table. An SIP-VOIP session service can be monitored without additionally deploying a separate signaling monitoring system, thus reducing the operating cost of the operator while meeting operational requirements of the operator and improving the operational result of a network provided by the operator.

In other embodiments of the disclosure, in order to save the overhead of a system and improve the performance of the system, it is determined whether an SIP signaling is an encrypted SIP signaling when the SIP signaling is received. IP information and port information of the SIP signaling are acquired if the received SIP signaling is an encrypted SIP signaling. The SIP signaling is directly decoded if the received SIP signaling is not an encrypted SIP signaling.

An apparatus for acquiring an SIP signaling decryption parameter is provided in a third embodiment of the disclosure.

Figure 4:
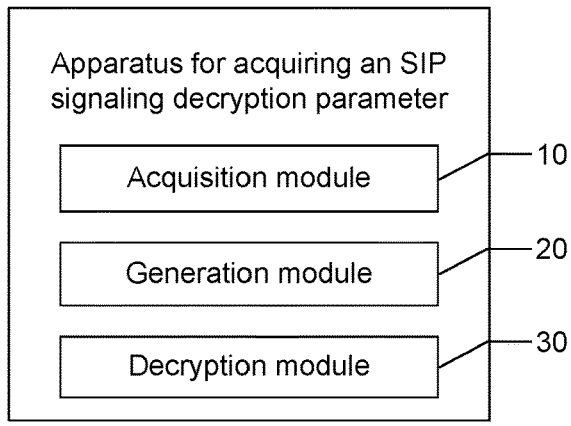
FIG. 4 is a schematic diagram illustrating functional modules of an apparatus for acquiring an SIP signaling decryption parameter according to a third embodiment of the disclosure.

Refer to FIG. 4 which is a schematic diagram illustrating functional modules of an apparatus for acquiring an SIP signaling decryption parameter according to a third embodiment of the disclosure.

In an embodiment, the apparatus for acquiring an SIP signaling decryption parameter includes an acquisition module 10 and a generation module 20. The acquisition module 10 is arranged to acquire authentication information of a Gm interface and authentication information of a Cx interface. Optionally, the embodiment of the disclosure is applicable to acquiring decryption parameters of an SIP signaling in a network session and decrypting the SIP signaling in the network session using the acquired decryption parameters.

In the embodiment, when a user of a UE side wants to conduct an SIP-VOIP session service by the UE, he needs to make an SIP-VOIP session service registration first. If it is needed to encrypt a session process, the user needs to indicate a requirement for an encrypted access during the registration process.

Figure 5:
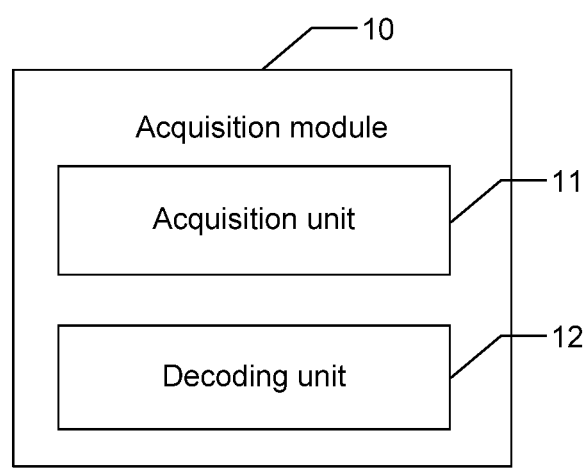
FIG. 5 is a schematic diagram illustrating detailed functional modules of the acquisition module shown in FIG. 4.

Refer to FIG. 5, the acquisition module 10 includes an acquisition unit 11 and a decoding unit 12. The acquisition unit 11 is arranged to acquire an SIP registration request sent from a client and a response signaling based on the registration request. The registration request and the response signaling for the registration request are clear-text SIP signaling, and access SIP encryption parameters are carried in the registration request. The decoding unit 12 is arranged to perform SIP decoding according to the registration request and the response signaling based on the registration request to acquire the client information and the authentication information of the Gm interface in the registration flow.

The initial clear-text registration request message initiated by the UE to the P-CSCF carries a Security-Client field in which parameters of an SA are carried including parameters of the SA-IN and the SA-OUT at the UE side. The monitoring system collects registration message parameters of the Gm interface which include an IMPU, an IMPI, an SA-IN and an SA-OUT. The P-CSCF, the I-CSCF and the S-CSCF in the IMS system perform exchange information with each other. The registration message is transferred to the S-CSCF and the S-CSCF applies for an authentication vector quintuplet <RAND, AUTN, XRES, CK, IK> from the HSS through the Cx interface and an MAR message and an MAA message, in which CK is an cipher key, RAND is an authentication challenge for authenticating a user, XRES is a response expected to be returned from the user as the result of the authentication of the RAND, AUTN is an authentication token for a UE to authenticate a core network, and IK is an integral key.

The acquisition unit 11 is further arranged to acquire an authentication request of the Cx interface sent from a network element and a response signaling based on the authentication request. The decoding unit 12 is further arranged to decode a DIAMETER protocol according to the authentication request and the response signaling for the authentication request to obtain the authentication information of the Cx interface.

The monitoring system acquires the MAR message and the MAA message of the Cx interface and an authentication quintuplet pair {IMPU, IMP, authentication quintuplet<RAND, AUTN, XRES, CK, IK>} of the Cx interface, as shown in table 3.

The S-CSCF sends a clear-text registration response 401 message in which authentication challenge information and an RAND, an AUTN, a CK and an IK are carried to the P-CSCF. The P-CSCF stores the CK and the IK, then deletes the CK and the IK, inserts the Security-Server field in which SA parameters including the parameters of the SA-IN and the SA-OUT at the P-CSCF side are carried, and sends the clear-text registration response 401 message to the UE. At this time, the parameters related to two unidirectional SAs at the side of the P-CSCF are provided.

The generation module 20 is arranged to generate an SA decryption table according to the acquired authentication information of the Gm interface and the Cx interface, wherein the SA decryption table includes SIP signaling decryption parameters.

After the authentication information of the Cx interface and the authentication information of the Gm interface are acquired, the SA decryption table including SIP signaling decryption parameters is generated according to the acquired authentication information of the Gm interface and authentication information of the Cx interface. The SA decryption table includes an IPMU, an IMPI, the SA-IN and the SA-OUT of an SA, a CK and an IK. After the SA decryption table is generated, each encrypted SIP signaling sent from the UE can be decrypted through the SA decryption table, thereby realizing an SIP signaling analysis. In the embodiments of the disclosure, an SIP signaling can be decrypted by merely collecting the authentication information of the Cx interface of an HSS, without deployment of another separate signaling monitoring system in the IMS system, thus an SIP-VOIP session service is monitored while the operating cost of the operator is reduced.

The signaling monitoring system collects the parameters included in a registration response of the Gm interface to acquire parameter pairs {IMPU, IMPI, authentication parameters <RAND, AUTN>, SA parameters SA-IN and SA-OUT} used in the authentication of the Gm interface, as shown in table 2. The monitoring system acquires the SA decryption table {IMPU, IMPI, SA-IN, SA-OUT, CK, IK} for the user by using the IMPU, the IMPI, the authentication parameters <RAND, AUTN> together with the authentication quintuplet pair and the parameter pairs for authentication, as shown in table 1.

When the UE receives the registration response 401 message, it may extract the RAND and the AUTN, calculate an MAC and an SQN according to the AUTN and calculate an XMAC, an RES, an IK and a CK according to the RAND and a long-term key stored in an ISIM card. Like the MAC, the XMAC is used to certify the pass of a core network through an authentication. The RES will be returned to the IMS network in the next registration request. The IK and the CK will be used for SIP encryption and integrity protection. At this time, the parameters related to two unidirectional SAs at the UE side are provided. Two unidirectional SAs (SA-IN, SA-OUT) are established between the UE and the P-CSCF. Then all of the subsequent SIP signaling between the UE and the P-CSCF will be transmitted through the IP and the PORT of the SA (SA-IN, SA-OUT) and encrypted with the encryption algorithm and the cipher key (CK) in the SA. The current registration of the UE is completed.

The UE sends an encrypted registration request (with a challenge response, an RES value and so on) to the P-CSCF through an SA-IN encryption tunnel. The P-CSCF decrypts an IPsec encrypted packet which is received through the IP and port of the SA-IN tunnel with the encryption algorithm and the key CK to restore the IPsec encrypted packet to a clear-text registration request (with a challenge response) and sends the clear-text registration request to the S-CSCF. The S-CSCF compares the challenge response RES in the registration request with the XRES in the authentication vector. The UE will pass the authentication if the RES is the same as the XRES. The S-CSCF sends a registration success response 2000K to the P-CSCF. The P-CSCF sends an encrypted registration success response 2000K to the UE through the SA-OUT encryption tunnel. The UE decrypts an IPsec packet received through the IP and port of the SA-OUT tunnel with the encryption algorithm and the key CK to restore the IPsec packet to a clear-text registration success response 2000K. The registration of the UE is completed.

Generating an SA decryption table during a registration process includes: receiving an SIP registration request sent by a client and a corresponding registration response signaling, acquiring client information corresponding to the request and acquiring a Gm interface signaling and a Cx interface signaling; generating SA encryption parameters according to the acquired Gm interface signaling and Cx interface signaling; creating an SA decryption table corresponding to the encryption communication channel of the client according to the generated SA encryption parameters and the acquired client information, as shown in FIG. 1. An encrypted SIP signaling passing through the encryption communication channel can be decrypted into a clear-text SIP signaling with the SA decryption table.

Optionally, the acquisition apparatus may further include a decryption module 30. If the UE subsequently initiates a registration refresh flow in which a re-negotiation about SA encryption parameters is needed, then the system needs to update the SA decryption table.

The acquisition unit 11 is further arranged to acquire an SIP registration information update request sent from a client through the SA encryption tunnel and a response signaling based on the update request, wherein the update request and the response signaling for the update request indicate an update of the access SIP encryption parameters. The decryption module 30 is further arranged to decrypt the update request and the response signaling for the update request according to the SA decryption table to obtain a decrypted update request and a decrypted response signaling for the update request. The generation module 20 is further arranged to acquire the authentication information of the Gm interface and the Cx interface in a registration update flow according to the decrypted update request and the decrypted response signaling for the update request so as to generate an updated SA decryption table.

The UE sends an encrypted registration request (with access SIP encryption parameters requesting an update) to the P-CSCF through the SA-IN encryption tunnel. The P-CSCF decrypts the IPsec packet received in the SA-IN tunnel with the encryption algorithm and the key CK to restore the IPsec packet to a clear-text registration request (with a challenge response) and sends the clear-text registration request to the S-CSCF. The S-CSCF sends a registration success response 2000K to the P-CSCF after it completes the interaction operations related to the authentication request and response of the Cx interface. The P-CSCF sends an encrypted registration success response 2000K with updated access SIP encryption parameters to the UE through the SA-OUT encryption tunnel.

The acquisition unit 11 collects an encrypted registration update request and an encrypted registration update response.

For the encrypted registration update request, the decryption module 30 acquires a decryption algorithm and a CK for decryption by searching SA-IN records of the SA decryption table using the destination IP and port of the request so as to acquire a clear-text registration update request. For the encrypted registration update response, the decryption module 30 acquires a decryption algorithm and a key CK by searching SA-OUT records of the SA decryption table using the destination IP and port of the response to decrypt the registration update response to obtain a clear-text registration update response.

The decoding unit 12 decodes the decrypted registration update request and the decrypted registration update response to obtain the authentication information of the Gm interface and decodes the authentication request and the authentication response to acquire the authentication information of the Cx interface.

The generation module 20 acquires the authentication information of the Gm interface and the Cx interface in a registration update flow according to the decoded update request and a decoded response signaling for the update request so as to generate an updated SA decryption table.

Refer to Table 1, the updated SA decryption table for the SIP signaling of the SIP-VOIP session service obtained after the registration is SA-IN parameters and SA-OUT parameters. Refer to Table 2, the authentication information of the Gm interface includes an IMPU, an IPMI, authentication parameters RAND and AUTN and SA parameters SA-IN and SA-OUT. Refer to Table 3, the authentication information of the Cx interface includes an IMPU, an IMPI and an authentication vector (RAND, AUTN, XRES, CK and IK).

According to the embodiment, authentication information of a Cx interface and authentication information of a Gm interface is acquired, and an SA decryption table including SIP signaling decryption parameters is generated according to the acquired authentication information of the Cx interface and the Gm interface, which will be used to decrypt an SIP signaling. An SIP-VOIP session service can be monitored without additionally deploying a separate signaling monitoring system, thus reducing the operating cost of the operator while meeting operational requirements of the operator and improving the operational result of a network provided by the operator.

Optionally, the acquisition unit is further arranged to determine IP information and port information of the SIP signaling of an SA encryption tunnel when the SIP signaling of the SA encryption tunnel is acquired. The decryption module 30 is further arranged to search, according to the acquired IP information and port information, the SA decryption table for the decryption algorithm and the key of an SA and decrypt the SIP signaling using the obtained decryption algorithm and key to obtain a clear-text SIP signaling corresponding to the encrypted SIP signaling. The decoding unit 12 is further arranged to decode the decrypted clear-text SIP signaling to obtain session data corresponding to the SIP signaling.

The SIP signaling may be an SIP signaling sent from the UE to a core network or an SIP signaling sent from the core network to the UE. For the encrypted SIP signaling sent from the UE to the core network, SA-IN records in the SA decryption table are searched with a destination address and port. For the encrypted SIP signaling sent from the core network to the UE, SA-OUT records in the SA decryption table are searched with a destination address and port. The IP information and the port information of an SIP signaling of the SA encryption tunnel are acquired when the SIP signaling of the SA encryption tunnel is acquired. The SA decryption table is searched according to the acquired IP information and port information for the decryption algorithm and the key of the SA, and the SIP signaling is decrypted using the obtained decryption algorithm and key to obtain a clear-text SIP signaling corresponding to the encrypted SIP signaling.

The decrypted clear-text SIP signaling is decoded to obtain session data corresponding to the SIP signaling. The decrypted clear-text SIP signaling can be transferred to a signaling analysis system, for example, a 4G network signaling monitoring system, which needs the decrypted clear-text SIP signaling. According to the embodiment, an encrypted SIP signaling is decrypted according to a generated SA decryption table. An SIP-VOIP session service can be monitored without additionally deploying a separate signaling monitoring system, thus reducing the operating cost of the operator while meeting operational requirements of the operator and improving the operational result of a network provided by the operator.

In other embodiments of the disclosure, in order to save the overhead of a system and improve the performance of the system, the decoding unit 12 determines whether an SIP signaling is an encrypted SIP signaling when the SIP signaling is received. IP information and port information of the SIP signaling are acquired if the received SIP signaling is an encrypted SIP signaling. The SIP signaling is directly decoded if the received SIP signaling is not an encrypted SIP signaling.

It should be appreciated by those of ordinary skilled in the art that all or a part of the steps of the foregoing method can be implemented by a piece of hardware under the instruction of a program stored on a computer-readable storage medium, such as Read-Only-Memory, a magnetic disk or a compact disc. Optionally, all or a part of the steps of the foregoing embodiments may also be implemented by one or more integrated circuits. Accordingly, each module/unit described in the foregoing embodiments may be implemented as a piece of hardware or a piece of software serving as a functional module. Therefore, the disclosure is not limited to the combination of a piece of hardware in a specific form and a piece of software in a specific form.

INDUSTRIAL APPLICABILITY

According to the embodiments of the disclosure, the authentication information of a Cx interface and the authentication information of a Gm interface is acquired, and an SA decryption table including SIP signaling decryption parameters is generated according to the acquired authentication information of the Cx interface and the Gm interface, so as to decrypt an SIP signaling using the SA decryption table. An SIP-VOIP service can be monitored without additionally deploying a separate signaling monitoring system, thus reducing the operating cost of the operator while meeting operational requirements of the operator and improving the operational result of a network provided by the operator.

What is claimed is:

1. A method for acquiring a Session Initiation Protocol (SIP) signaling decryption parameter, applied to a signaling monitoring system, comprising:
   acquiring authentication information of a Gm interface between a user equipment (UE) and a Proxy Call Session Control Function (P-CSCF) and authentication information of a Cx interface;
   generating a bidirectional Security Association (SA) decryption table according to the acquired authentication information of the Cx interface and authentication information of the Gm interface, wherein the bidirectional SA decryption table includes SIP signaling decryption parameters;
   receiving an SIP signaling sent by the UE or the P-CSCF;
   determining whether the SIP signaling is an encrypted SIP signaling; and
   decrypting the SIP signaling according to the bidirectional SA decryption table when the SIP signaling is the encrypted SIP signaling,
   wherein after generating the bidirectional SA decryption table according to the acquired authentication information of the Cx interface and authentication information of the Gm interface, the method further comprises:
   determining IP information and port information of the SIP signaling of an SA encryption tunnel when the SIP signaling is acquired;
   searching, according to the acquired IP information and port information, the bidirectional SA decryption table to obtain a decryption algorithm and key of an SA, wherein decrypting the SIP signaling according to the bidirectional SA decryption table when the SIP signaling is the encrypted SIP signaling comprises decrypting the SIP signaling with the obtained decryption algorithm and key of the SA to obtain a clear-text SIP signaling corresponding to the encrypted SIP signaling; and
   decoding the decrypted clear-text SIP signaling to obtain session data corresponding to the SIP signaling.

2. The method for acquiring an SIP signaling decryption parameter according to claim 1, wherein acquiring the authentication information of the Gm interface comprises:
   acquiring an SIP registration request sent from a client and a response signaling based on the SIP registration request, wherein the SIP registration request and the response signaling based on the SIP registration request are clear-text SIP signaling, and the SIP registration request carries access SIP encryption parameters; and
   performing SIP decoding according to the SIP registration request and the response signaling based on the SIP registration request to obtain the authentication information of the Gm interface in a registration flow.

3. The method for acquiring an SIP signaling decryption parameter according to claim 2, wherein acquiring the authentication information of the Cx interface comprises:
   acquiring an authentication request of the Cx interface sent from a network element and a response signaling based on the authentication request; and
   performing protocol decoding according to the authentication request and the response signaling based on the authentication request to obtain the authentication information of the Cx interface.

4. The method for acquiring an SIP signaling decryption parameter according to claim 2, wherein after generating the bidirectional SA decryption table according to the acquired authentication information of the Cx interface and authentication information of the Gm interface, the method further comprises:
   acquiring an SIP registration information update request sent from the client through the SA encryption tunnel and a response signaling based on the SIP registration information update request, wherein the SIP registration information update request and the response signaling based on the SIP registration information update request indicate an update of the access SIP encryption parameters;
   decrypting the SIP registration information update request and the response signaling based on the SIP registration information update request according to the bidirectional SA decryption table to obtain a decrypted update request and a decrypted response signaling for the SIP registration information update request; and
   acquiring the authentication information of the Gm interface and the authentication information of the Cx interface in an update registration flow according to the obtained decrypted update request and decrypted response signaling for the SIP registration information update request so as to generate an updated SA decryption table.

5. An apparatus for acquiring a Session Initiation Protocol (SIP) signaling decryption parameter, applied to a signaling monitoring system, the apparatus comprising a processor and a memory storing instructions executable by the processor, wherein the processor is arranged to:
   acquire authentication information of a Gm interface between a user equipment (UE) and a Proxy Call Session Control Function (P-CSCF) and authentication information of a Cx interface;
   generate a bidirectional Security Association (SA) decryption table according to the acquired authentication information of the Cx interface and authentication information of the Gm interface, wherein the bidirectional SA decryption table includes SIP signaling decryption parameters;
   receive an SIP signaling sent by the UE or the P-CSCF;
   determine whether the SIP signaling is an encrypted SIP signaling; and
   decrypt the SIP signaling according to the bidirectional SA decryption table when the SIP signaling is the encrypted SIP signaling,
   wherein the processor is further arranged to:
   determine IP information and port information of the SIP signaling of an SA encryption tunnel when the SIP signaling is acquired;
   search, according to the acquired IP information and port information, the bidirectional SA decryption table to obtain a decryption algorithm and key of an SA, wherein the process is arranged to decrypt the SIP signaling according to the bidirectional SA decryption table when the SIP signaling is the encrypted SIP signaling by decrypting the SIP signaling with the obtained decryption algorithm and key of the SA to obtain a clear-text SIP signaling corresponding to the encrypted SIP signaling; and
   decode the decrypted clear-text SIP signaling to obtain session data corresponding to the SIP signaling.

6. The apparatus for acquiring an SIP signaling decryption parameter according to claim 5, wherein the processor is further arranged to:

acquire an SIP registration request sent from a client and a response signaling based on the SIP registration request, wherein the SIP registration request and the response signaling based on the SIP registration request are clear-text SIP signaling, and the SIP registration request carries access SIP encryption parameters; and perform SIP decoding according to the SIP registration request and the response signaling based on the SIP registration request to obtain the authentication information of the Gm interface in a registration flow.

7. The apparatus for acquiring an SIP signaling decryption parameter according to claim 6, wherein the processor is further arranged to:

acquire an authentication request of the Cx interface sent from a network element and a response signaling based on the authentication request; and perform protocol decoding according to the authentication request and the response signaling based on the authentication request to obtain the authentication information of the Cx interface.

8. The apparatus for acquiring an SIP signaling decryption parameter according to claim 6, wherein the processor is further arranged to:

acquire an SIP registration information update request sent from the client through the SA encryption tunnel and a response signaling based on the SIP registration information update request, wherein the SIP registration information update request and the response signaling based on the SIP registration information update request indicate an update of the access SIP encryption parameters;

decrypt the SIP registration information update request and the response signaling based on the SIP registration information update request according to the bidirectional SA decryption table to obtain a decrypted update request and a decrypted response signaling for the SIP registration information update request; and acquire the authentication information of the Gm interface and the authentication information of the Cx interface in an update registration flow according to the obtained decrypted update request and decrypted response signaling for the SIP registration information update request so as to generate an updated SA decryption table.

* * * * *